United States Patent [19]

Baitinger et al.

[11] 3,798,621

[45] Mar. 19, 1974

[54] MONOLITHIC STORAGE ARRANGEMENT WITH LATENT BIT PATTERN

[75] Inventors: Utz Baitinger, Stuttgart; Knut Najmann, Gartringen; Rolf Remshardt, Stuttgart, all of Germany

[73] Assignee: Internationl Business Machines Corporation, Armonk, N.Y.

[22] Filed: Dec. 26, 1972

[21] Appl. No.: 318,147

[30] Foreign Application Priority Data

Dec. 30, 1971 Germany .......................... 2165729

[52] U.S. Cl. ........ 340/173 R, 340/173 FF, 307/238

[51] Int. Cl. ........................................... G11b

[58] Field of Search ................. 340/173 R, 173 FF; 307/238, 279

[56] References Cited

UNITED STATES PATENTS

| | | | |
|---|---|---|---|
| 3,292,008 | 12/1966 | Rapp | 340/173 R |
| 3,493,786 | 2/1970 | Ahrons | 340/173 R |
| 3,535,699 | 10/1970 | Gaensslen | 340/173 R |
| 3,753,242 | 8/1973 | Townsend | 340/173 R |

*Primary Examiner*—Terrell W. Fears
*Attorney, Agent, or Firm*—Kenneth R. Stevens

[57] ABSTRACT

A monolithic storage arrangement comprising a plurality of symmetrically disposed bistable storage cells operable both as read/write and read-only elements.

6 Claims, 4 Drawing Figures

MONOLITHIC STORAGE ARRANGEMENT WITH LATENT BIT PATTERN

BACKGROUND OF THE INVENTION

Presently known monolithic storage arrangements fabricated by current semiconductor techniques basically comprise read/write or read-only storage elements. The read/write storage cells exhibit conventional storage characteristics, i.e., that data is written into a storage location, stored at a particular location, and read out at a later time. In a read-only storage cell, the information is permanently stored at fixed locations which then can be read out.

In some systems, the capability and function of both storage type of cells are required. Thus, during a startup of a computer system, information often is transmitted from a read-only unit into a read/write storage unit. The read-only storage unit contains the required startup program and transmits instructions via the central computing unit into the read/write memory. Consequently, such a system requires a separate read-only storage apart from the read/write storage. A storage arrangement which can be applied both as read/-write and as read-only storage is valuable, particularly with respect to improvements in cost and size and with an attendant reduction in complexity. Such an arrangement has been referred to as a latent image memory.

The asymmetric nature of triggers or bistable circuits, per se, is known. The "Handbook of Semiconductor Electronics," Hunter, Second Edition, for example, discusses on pages 1,520–1,534 various methods for insuring stability in bistable circuits in order to prevent the loss of the information stored therein. Accordingly, asymmetries in prior art bistable circuits are disadvantageous and a problem since they render the bistable circuits unstable and, thus, unreliable when employed as a storage cell.

The present invention takes this known disadvantage and applies it to bistable storage cells for constructing a read/write cell which also possesses a latent bit pattern capability. In other words, in a latent bit memory storage arrangement, an undesirable characteristic formerly associated with bistable storage cells is now utilized for an advantageous application in latent image memory storage cells.

Known techniques for personalizing storage cells in a latent bit pattern scheme include the principles of intentional AC or DC asymmetry. A typical AC asymmetry is achieved in bistable storage cells by employing different time constants for each half of the bistable circuit. These time constants can be a function of the collector load resistors, the collector capacitances, or related to the emitter voltages of the transistors used to form the storage cells. Typical DC asymmetry techniques employ storage cells which are personalized by a suitable one-sided resistor element or Schottky barrier diode.

An essential disadvantage of these known latent image storage arrangements resides in the fact that the latent bit pattern is generated only by switching an operational voltage off and then on. Some suggestions to avoid this disadvantage of using a pulsating operating voltage is to arrange a diode element at one side of the storage cell which, during read/write operation, is kept in a non-conductive state. During the use of the storage cell as a read-only storage device, the diode is switched for a short time into a conductive state. This prior art arrangement is described in greater detail in the article "Electronics," Aug. 16, 1971, pages 82–85. The mentioned storage arrangements which are capable of use as both a read/write and a read-only storage means have a common outstanding feature in that the storage cells must be of an asymmetrical structure. Moreover, normal symmetries are introduced by manufacturing tolerances and, therefore, intentional asymmetries must be of relatively high value in order to insure the desired function. Another problem arises when introducing DC asymmetry into storage cells in that different value currents are caused to flow in each side of the storage cell. These different current values require special design and complexity in the driver and read circuits.

A common problem in DC or AC asymmetrical latent image storage cells is the problem of stability. Storage cells constructed with DC asymmetry when operated as read/write storage cells exhibit a preferred switching state. This fact results in a higher failure sensitivity. Storage cells constructed with an AC asymmetry contain different time constants and, thus, have a tendency to switch into a preferred state, which problem can be avoided only by switching at a slower speed. Thus, in the operation of a latent image memory, an irreconcilable problem exists between the read-only and the read/write mode of operation. During read-only operation, the storage element requires a high switching speed in order to insure the effect of asymmetry. In contradistinction, during the read/write mode of operation, the asymmetrical nature of the storage element is undesirable. Moreover, these prior art storage cells require increased space requirements when implemented as a monolithic structure.

SUMMARY OF THE INVENTION

Therefore, it is an object of the present invention to provide a monolithic storage arrangement which comprises a plurality of symmetrically structured bistable storage cells which can be operated both as read/write storage elements and read-only storage elements. Excellent stability and switching speeds are obtained when operated as a read/write storage element.

The present invention provides a latent image memory comprising a controllable switching element for generating an asymmetry connected to one side of the bistable storage cell which is operational during a read-only mode, and at the other respective side of the storage cell is connected an element for maintaining the symmetry of the storage cell during a read/write mode of operation. All switching elements are preferably connected to a common control line suitably biased during the read-only mode of operation.

The foregoing and other objects, features and advantages of the invention will be apparent from the following more particular descriptions and preferred embodiments of the invention as illustrated in the accompanying drawings.

DESCRIPTION OF THE PREFERRED EMBODIMENTS

The present structure provides particular advantage when implemented in monolithic form in that all of the elements of the cell are of the same type with the exception of the elements used to provide asymmetry on one-half of the storage cell. Although the present invention is illustrated as being implemented by field effect transistors, the general principles are equally applicable to bipolar transistors.

A particular advantage is realized when the invention is implemented with field effect transistors because the field effect transistors forming the actual storage cell are fabricated as standard thin oxide elements, and the switching elements and symmetry elements as thick oxide elements due to the relationship between the control line and the diffusion zones.

During a read-only mode of operation, the write-in process is accelerated. This feature is attained by the unique arrangement of field effect transistors on the side opposite of the field effect transistor employed as a switching element.

Figure 1:
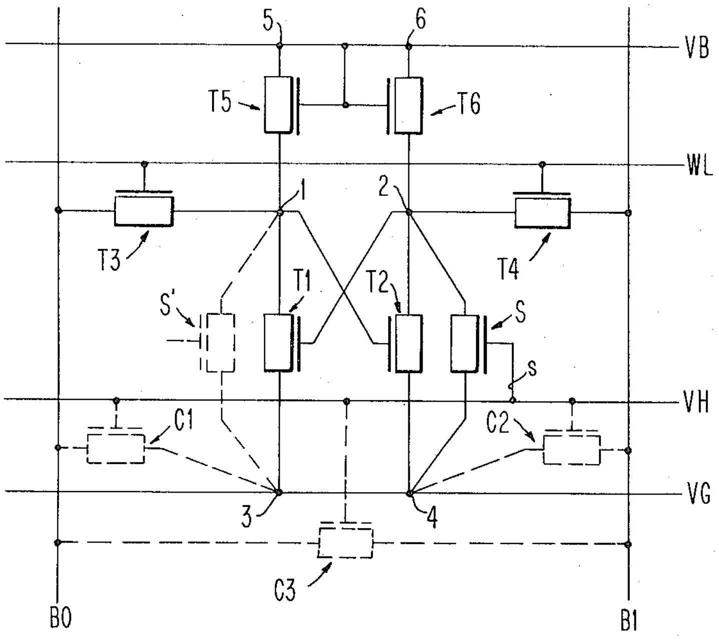
FIGS. 1 and 3 represent schematic illustrations of preferred embodiments of the present invention.

Now referring to FIG. 1, the storage cell comprises a conventional bistable circuit comprising six field effect transistors T1–T6. The bistable characteristic is achieved through the two cross-coupled transistors T1 and T2 which, in turn, are connected to the load transistors T5 and T6. A line VB applies the operating voltage. The gate terminals of transistors T5 and T6 are also connected to line VB. During the nonselected mode of operation, a suitable value of direct current is continuously carried by the applicable transistor T5, T6 in order to maintain the information stored in either of the transistors T1 or T2 in accordance with the voltage at nodes 1 or 2.

Each of the nodes 1 or 2 is connected to an associated bit line B0, B1 by way of a field effect transistor T3 and T4, respectively. The gates of transistors T3 and T4 serve as write/read transistors and operate in a well known manner via connection to word line WL. At this point, the described circuit provides a conventional storage cell functioning as a read/write element. The writing of information into the storage cell is performed by means of suitable potentials being applied to word line WL and one of the bit lines B0 or B1. This causes one of the read/write transistors T3, T4 to be placed in a conductive state so as to set the appropriate transistor T1 or T2 to a conductive state. Reading is performed by applying suitable potentials to word line WL and bit lines B0 and B1 by means of read/write transistors T3 and T4. This conventional read/write storage cell is modified in the following manner in order to also function as a read-only storage element.

As shown in FIG. 1, an additional switching unit illustrated as field effect transistor S is connected to one side of the bistable circuit and is connected across transistor T2. The gate of transistor S is connected to line VH via line *s*.

Operatively, for read-only personalization, when a voltage is applied to line VH via line s to the gate of transistor S, it is rendered conductive so as to short circuit transistor T2. Accordingly, node 2 is discharged via a line VG connected to transistors T1 and T2 via nodes 3 and 4. This operation enters information into the storage cell depending on whether the switching element, transistor S, is connected to the right or left side of the cell. Accordingly, in the read-only mode of operation, the storage cell is personalized by connecting the source and drain terminals either across nodes 2 and 4 or at 1 and 3 in conjunction with the voltages applied to the VH and VG lines.

If, on the other hand, it is desired to operate the storage cell in a standard read/write mode of operation, the transistor S is rendered non-conductive by applying the appropriate voltage level to its gate terminal on line s by way of line VH. With transistor S in a non-conductive state, the transistors T3 and T4 perform their conventional read/write function. However, the existence of the transistor S across nodes 2 and 4 creates an asymmetry problem when the cell is used in a read/write mode of operation for the storage of information, as is well known in the prior art.

In order to restore the asymmetry to the read/write storage cell mode of operation, another field effect transistor designated S' is connected across nodes 1 and 3. However, its gate terminal is left unconnected to line VH. Accordingly, in this specific embodiment, the transistor S having its gate terminal connected to line VH is employed as an asymmetrical element in the read-only mode of operation, while the transistor S', shown in phantom lines, is employed as a balancing element when the storage cell is employed as a read/write storage cell. When monolithically implemented, it is possible to fabricate transistors T1–T6 as standard thin oxide elements and transistors S and S' as thick oxide elements. Accordingly, additional drain and source diffusions for transistors S and S' are eliminated. This type of implementation is an advantage in that increased densities are possible.

Figure 2:
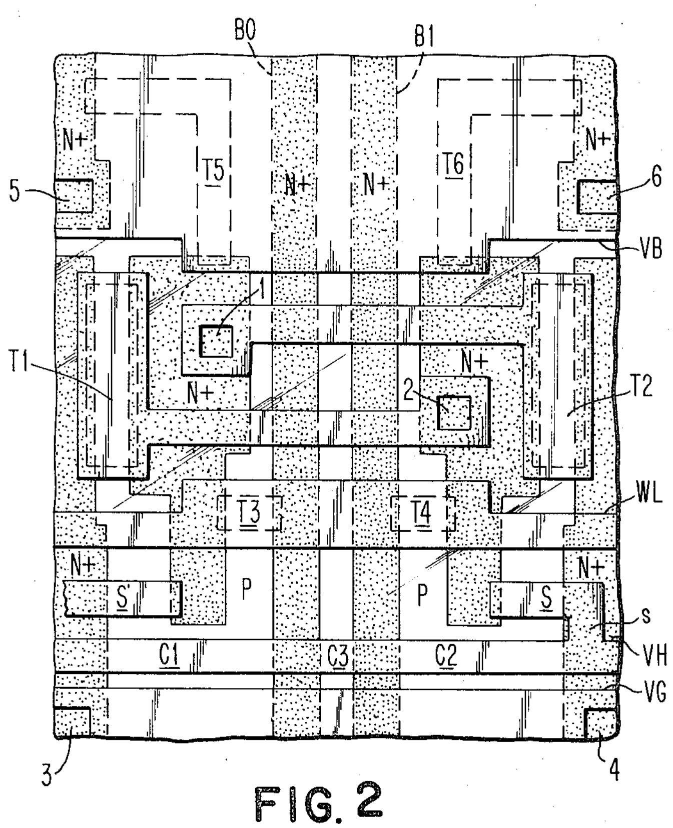
FIGS. 2 and 4 illustrate monolithic implementations for the schematic storage cells illustrated in FIGS. 1 and 3.

Now referring to FIG. 2, it illustrates a plan view of a monolithic implementation for the storage cell schematically shown in FIG. 1. The starting material is labelled as a P type conductive semiconductor substrate and shown non-shaded. A plurality of N+ conductive diffused regions are introduced into the surface of the P substrate shown as shaded areas. The surfaces of the P type substrate and the N+ diffused regions are covered in a known manner with a thick isolating oxide layer. On top of this thick oxide layer, metal lines are deposited and illustrated by the heavy framing. Below the metal surfaces in the area of the field effect transistor gate terminals, the thick oxide layers change into a thin gate oxide region which is schematically represented by the dashed rectangles and, in the embodiment of FIG. 1, correspond to the formation of the gate electrodes for transistors T1–T6. Contact holes are opened through the oxide so as to provide metal contact to the plurality of N+ diffused regions at the plurality of nodes designated 1–6.

Again, corresponding reference numerals are employed in FIG. 2 to represent the identical elements schematically shown in FIG. 1. The bit lines symmetrically disposed, B0 and B1, are formed by N+ conductive diffused regions extending vertically across the starting substrate. All the remaining symmetrically arranged N+ diffusion zones form the drain and source regions for the individual field effect transistors. The gate electrodes and the conductive interconnections, with the exception of the bit lines B0 and B1, comprise metal interconnections. Again, the transistors T1–T6 comprising the conventional storage cell are constituted by thin oxide elements, i.e., MOS field effect transistors as is well known in the art.

The field effect transistors S and S' are formed with a thick oxide gate electrode and this is schematically designated in FIG. 2 by the absence of the dashed rectangles used to schematically illustrate a thin oxide in the formation of transistors T1–T6. The gate electrode of transistor S is connected to the metallic line BH so as to provide the necessary asymmetry during a read-only mode of operation, and which can also be biased to an off condition so as to provide a matched symmetry to transistor S' when transistors T1 and T2 are employed in a standard read/write mode of operation.

In addition, as schematically shown in phantom in FIG. 1, the metallic line VH forms three parasitic thick oxide field effect transistors C1, C2 and C3 constituted by the metallic line VH overlying the thick oxide region separating the transistor N+ diffused regions and the pair of lines B0 and B1. The diffused lines B0 and B1 are symmetrically disposed with respect to the left and right hand diffusions, contacted by metal contacts 3 and 4, for example. Accordingly, C1, C2, and C3 present a symmetrical impedance (overall topographical symmetry) to the operation of the storage cell in a read/write mode of operation so as to prevent the instability problems and thus maintain the objectives of the overall invention.

In the operation of the storage cell of FIG. 1, node 2 is discharged by means of the field effect transistor S. Accordingly, during personalization of the storage cell as a read-only device, i.e., writing information the charging of node 1 is accomplished at a slower rate because of the impedance presented by its associated high resistance field effect transistor T5, employed as a load resistor. In order to further improve the overall symmetry and stability of the storage cell during read/write random access operation while reducing the time required to write-in or personalize the storage cell for a read-only mode of operation, additional thick oxide field effect transistors D and D' are added to the previous embodiment illustrated in FIG. 1, shown in FIGS. 3 and 4.

The device D is connected between the line B0, node 1, and line VH. Similarly, the device D' is connected between node 2 and line B1 while its gate terminal is left unconnected. The addition of device D permits node 1 to be charged upon the application of a charging potential on line B0 and a suitable potential on line VH in order to render the device D conductive and, thus, increase the speed of write-in. The device D' is connected between node 2 and diffused line B1 in order to balance the symmetry of the storage cell due to the device D on the other side of the cell. As previously described, the gate terminal of device D' is left unconnected. During read/write operation, the device D is biased off via line VH and line *d* and, thus, impedance on both sides of the storage cell is equal so as to maintain the stability of the cell.

Figure 3:
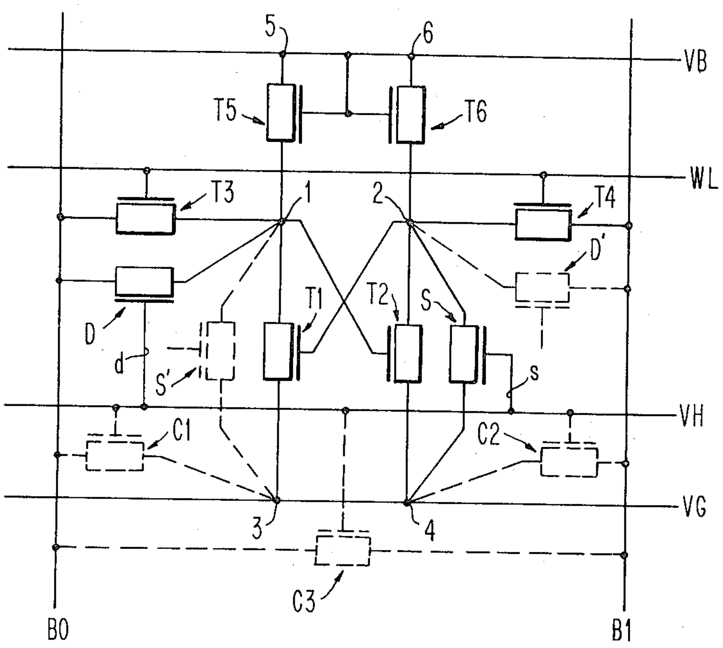
Figure 4:
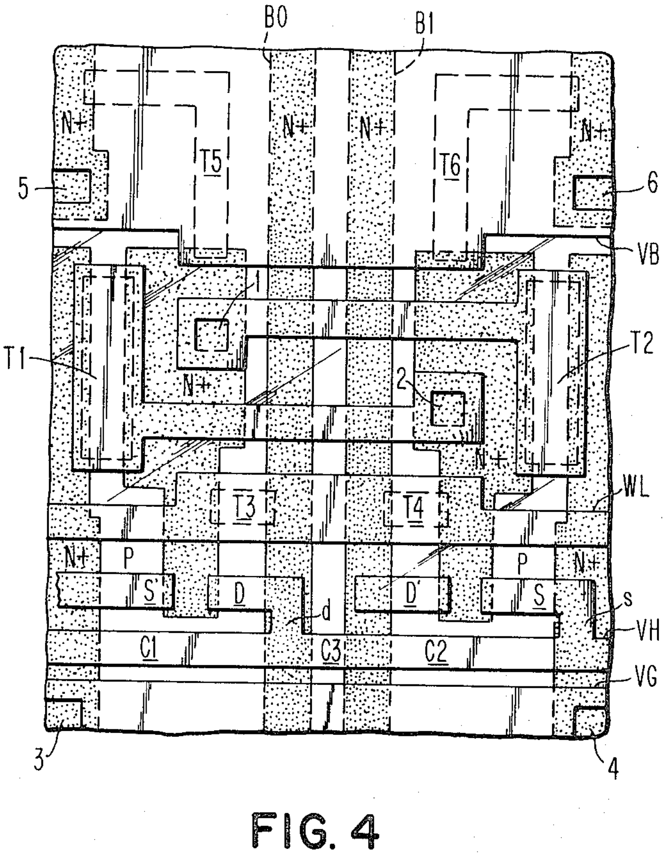

A monolithic implementation of the storage cell illustrated in FIG. 3 is identical to that previously described in FIG. 2 except with the addition of the thick oxide parasitic field effect transistor devices D and D' formed by a metal line on the thick oxide layer between appropriate N+ diffusions and the diffused lines B0 and B1. Again, like reference numerals are employed in FIG. 4 to illustrate the identical elements schematically illustrated in FIG. 3. Again, this additional structure can be monolithically implemented without increasing the overall area of the storage cell.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A monolithic storage array comprising:
   A. A plurality of symmetrical bistable storage cells, each operable as read/write and read-only storage elements,
   B. a controllable switching element connected to one side of a cell for providing a predetermined asymmetry during personalization of said cells as read-only elements, and
   C. a symmetrical impedance element connected at the respective other side of said storage cells for maintaining the overall impedance symmetry of said storage cells during read/write operation.

2. A monolithic storage array as in claim 1 comprising:
   A. a common control line connected to said controllable switching elements for providing selective energization signals thereto.

3. A monolithic storage array as in claim 2 wherein:
   A. said symmetrical impedance elements comprise fixed impedances.

4. A monolithic storage array as in claim 3 wherein:
   A. said controllable switching elements comprise thick oxide field effect transistors, and
   B. said fixed impedance elements comprise thick oxide field effect transistors.

5. A monolithic storage array as in claim 4 wherein:
   A. said bistable storage cells comprise a pair of thin oxide field effect transistors, and
   B. said control line comprises a diffused region symmetrically disposed between said pair of thin oxide field effect transistors constituting said bistable cells.

6. A monolithic storage array as in claim 5 further including a thick oxide field effect transistor connected to the side of the bistable cell having said fixed impedance element connected thereto for establishing additional symmetry during the read-only personalization.

* * * * *